US008174379B2

(12) United States Patent
Black

(10) Patent No.: US 8,174,379 B2
(45) Date of Patent: May 8, 2012

(54) NETWORKED POWER AND COMMUNICATION RECEPTACLE DEVICES

(75) Inventor: Dave Black, Orange, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 314 days.

(21) Appl. No.: 12/476,224

(22) Filed: Jun. 1, 2009

(65) Prior Publication Data

US 2009/0303021 A1 Dec. 10, 2009

Related U.S. Application Data

(60) Provisional application No. 61/059,449, filed on Jun. 6, 2008.

(51) Int. Cl.
*H04M 11/04* (2006.01)
*H04Q 1/30* (2006.01)
*G08B 13/12* (2006.01)
*H01R 25/00* (2006.01)

(52) U.S. Cl. ................ 340/538; 340/538.17; 340/568.2; 340/568.3; 340/568.4; 340/12.39; 439/215; 439/53; 174/59; 174/64; 108/50.02; 361/601

(58) Field of Classification Search .................. 340/538; 439/215

See application file for complete search history.

(56) References Cited

U.S. PATENT DOCUMENTS

| | | | | |
|---|---|---|---|---|
| 4,775,328 | A * | 10/1988 | McCarthy | 439/211 |
| 5,096,434 | A * | 3/1992 | Byrne | 439/215 |
| 6,652,288 | B2 * | 11/2003 | Laukhuf et al. | 439/32 |
| 7,294,005 | B1 * | 11/2007 | Laukhuf | 439/215 |

* cited by examiner

*Primary Examiner* — Donnie Crosland
(74) *Attorney, Agent, or Firm* — Raymond A. Nuzzo

(57) ABSTRACT

A network of power and communication receptacle devices having a plurality of power and communication receptacle devices. Each power and communication receptacle device has at least one power receptacle, at least one communication receptacle, and a power cable assembly having a dual power head. The power cable assembly is configured to provide electrical power to the power receptacle. The network includes a plurality of interconnecting power cables. Each power cable has a first power feeder electrically connected to the dual power head of one of the power and communication receptacle devices and a second power feeder electrically connected to the dual power head of a next power and communication receptacle device. The network includes a power feeding cable having electrically connected thereto a power feeder for connection to a dual power head of a first one of the power and communication receptacles and a device for connection to a power source. The network also includes a communication signal switching device having a plurality of ports. The communication receptacle of each power and communication receptacle device is in electronic signal communication with a corresponding port of the communication signal switching device.

10 Claims, 17 Drawing Sheets

NETWORKED POWER AND COMMUNICATION RECEPTACLE DEVICES

CROSS-REFERENCE TO RELATED APPLICATIONS

This application claims the benefit of U.S. provisional application No. 61/059,449, filed Jun. 6, 2008. The entire disclosure of the aforesaid provisional application No. 61/059,449 is hereby incorporated by reference.

TECHNICAL FIELD

The present invention generally relates to networked power and communication receptacles that can be used with an article of furniture such as a table, desk, work bench, work station or similar article.

BACKGROUND ART

Power and communication receptacles that are mounted in openings of furniture units or articles are known in the art. Such power and communication receptacles are used in articles of furniture such as desks, tables, work benches, work stations and similar articles. One such power and communication receptacle is disclosed in U.S. Pat. No. 7,312,393 entitled "Electrical and Communications Receptacle for Furniture". Another such power and communication receptacle is disclosed in U.S. Pat. No. 6,802,577 entitled "Enclosure System for Electronic Equipment Concealable in a Table Top". U.S. Pat. No. 5,980,279 entitled "Recessed Electrical Receptacle and Work Surface" and U.S. Pat. No. 5,575,668 entitled "Temporary Power/Data Tap" also disclose power and communication receptacles that are mounted in furniture units or similar articles. All of the aforesaid devices have power receptacles that provide A.C. voltage for powering equipment and communication receptacles (e.g. RJ45) for allowing connection to a telephone line, internet, wireless modem, etc.

DISCLOSURE OF THE INVENTION

The present invention is directed to a network of power and communication receptacle devices. Each power and communication receptacle device comprises at least one power receptacle, at least one communication receptacle, and a power cable assembly having a dual power head. The power cable assembly is configured to provide electrical power to the power receptacle. The network further comprises a plurality of interconnecting power cables. Each interconnecting power cable has a first power feeder electrically connected to the dual power head of one of the power and communication receptacle devices and a second power feeder electrically connected to the dual power head of a next power and communication receptacle device. The network further comprises a power feeding cable that comprises a power feeder for connection to a dual power head of one of the power and communication receptacle devices and, a device for connection to a power source. The network further comprises a communication signal switching device that has a plurality of ports wherein the communication receptacle of each power and communication receptacle device is in electronic signal communication with a corresponding port of the communication signal switching device.

An important advantage of the present invention is that the power and communication receptacle devices do not have to be installed and/or arranged in a particular sequence in order for the network to operate correctly. Thus, unlike many prior art networks, the power and communication receptacle devices of the present invention may be arranged and/or installed in a non-sequential order.

Other features and advantages of the present invention are described in the ensuing description.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

BEST MODE FOR CARRYING OUT THE INVENTION:

The ensuing detailed description is exemplary of the preferred embodiment of the present invention, the scope of which is limited only by the claims appended hereto.

Figure 1A:
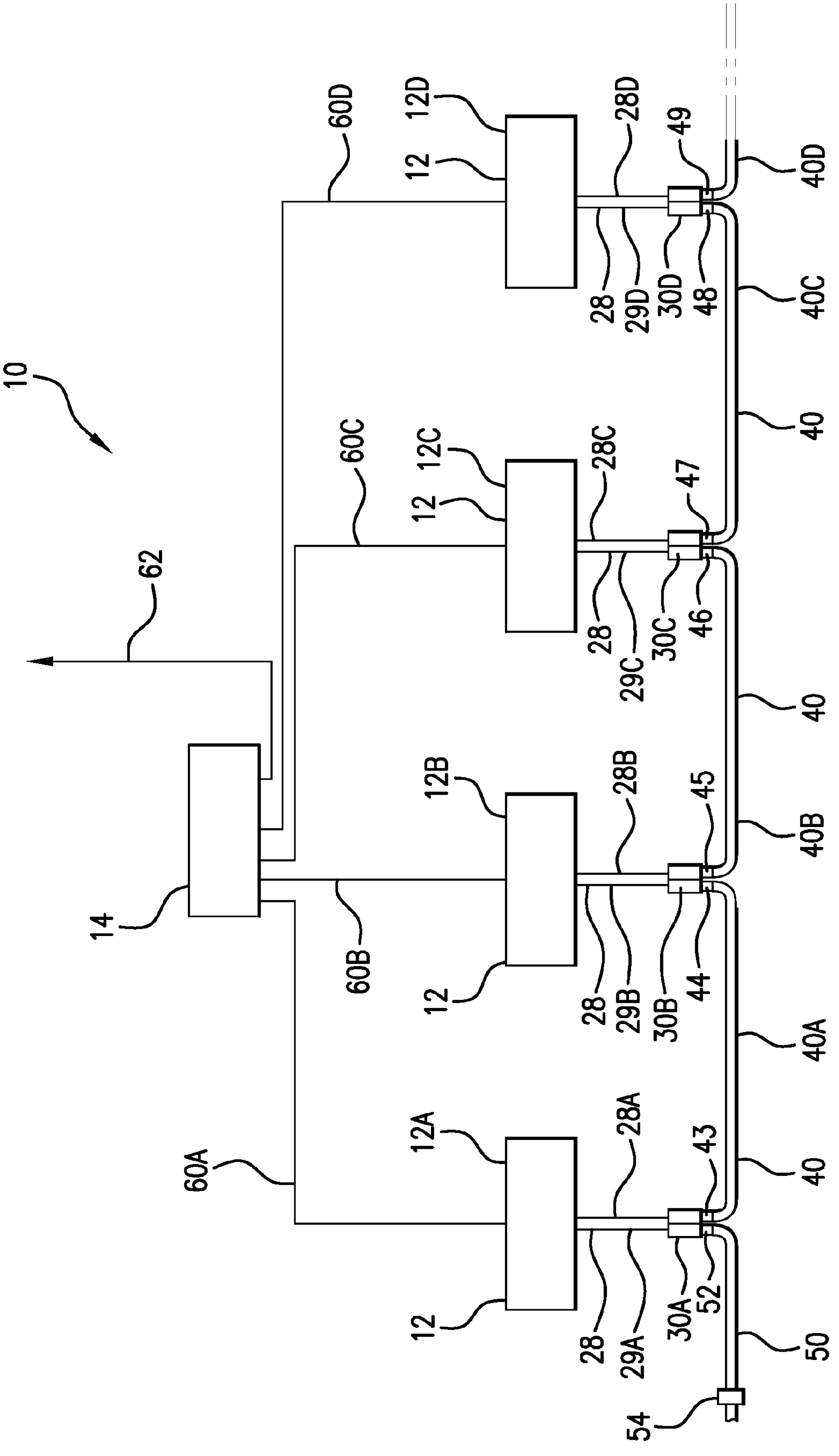
FIG. 1A is a block diagram of the apparatus of the present invention.

Referring to FIG. 1A, there is shown apparatus 10 of the present invention. Apparatus 10 generally comprises a plurality of power and communication receptacle devices 12 and at least one switch device 14. For purposes of describing the present invention herein, devices 12 are referred to by reference numbers 12A, 12B, 12C and 12D. Switch device 14 is configured to handle cables or wires that are to be connected to telephone lines, the internet, wireless modem, etc.

It is to be understood that apparatus 10 can be configured to have only two power and communication receptacle devices 12, or it can be configured to have more than four power and communication receptacle devices 12. Furthermore, it is to be understood that apparatus 10 may use more than one switch device 14.

Referring to FIGS. 2A-2E, each power and communication receptacle device 12 comprises a housing 16 that is sized to fit into an opening in an article of furniture (not shown) such as a table, work bench, work station, etc. Housing 16 has peripheral portion 18 that extends about housing 16 and which rests upon the work surface (not shown) of the aforesaid unit or article of furniture. Lid 17 is pivotally attached to housing 16 (see FIG. 4). Power and communication receptacle device 12 further comprises a panel 20 to which are connected power receptacles 24. Each power receptacle 24 is configured to provide A.C. voltage (e.g. 117 VAC) to power office or laboratory equipment, e.g. personal computers, oscilloscopes, etc. Power and communication receptacle device 12 further includes at least one communication receptacle 26. Communication receptacle 26 is attached to panel 20. In one embodiment, communication receptacle 26 is configured as an RJ45 receptacle. Telephones, modems or other communication equipment may be plugged into communication receptacle 26. Each power and communication receptacle device 12 may be configured as any one of a variety of devices known in the art. Examples of such devices are described in the aforementioned U.S. Pat. Nos. 5,980,279 and 7,312,393, the disclosures of which patents are hereby incorporated by reference.

Figure 2A:
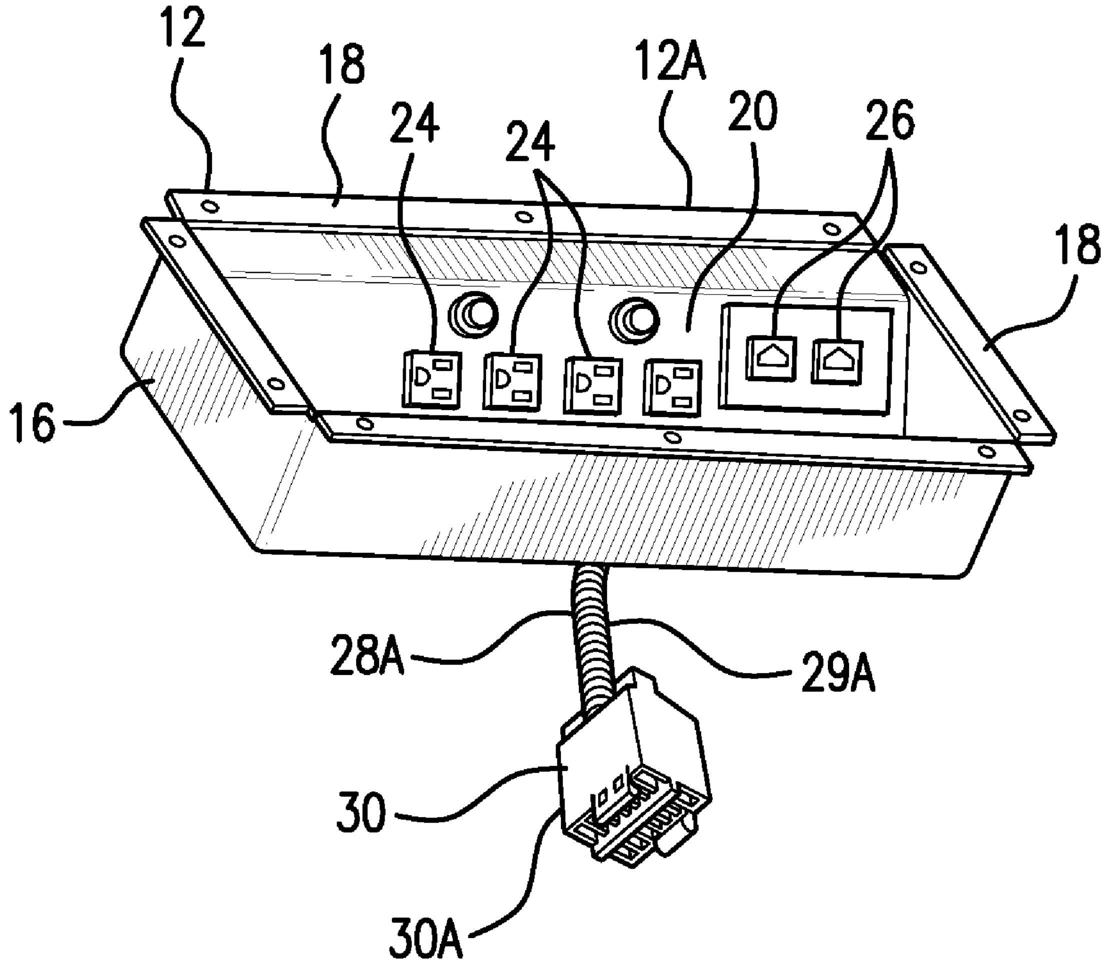
FIG. 2A is a perspective view of one of the power and communication receptacle devices that are depicted in FIG. 1.
Figure 2B:
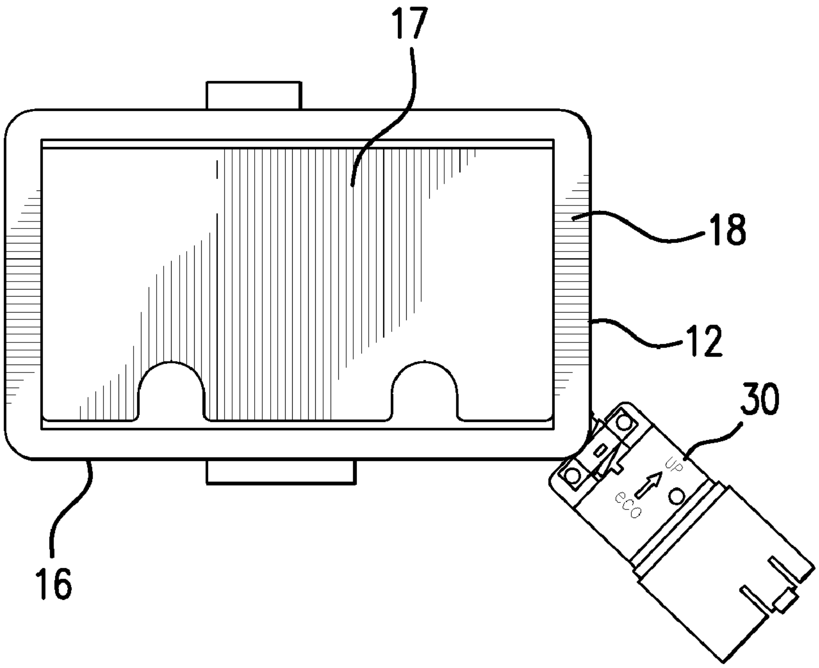
FIG. 2B is a top view of the power and communication receptacle device shown in FIG. 2A.
Figure 2C:
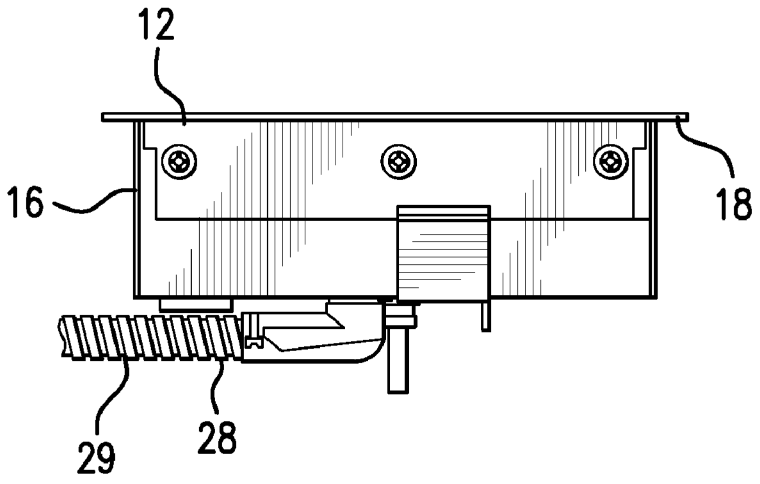
FIG. 2C is a front view of the power and communication receptacle device shown in FIG. 2A.
Figure 2D:
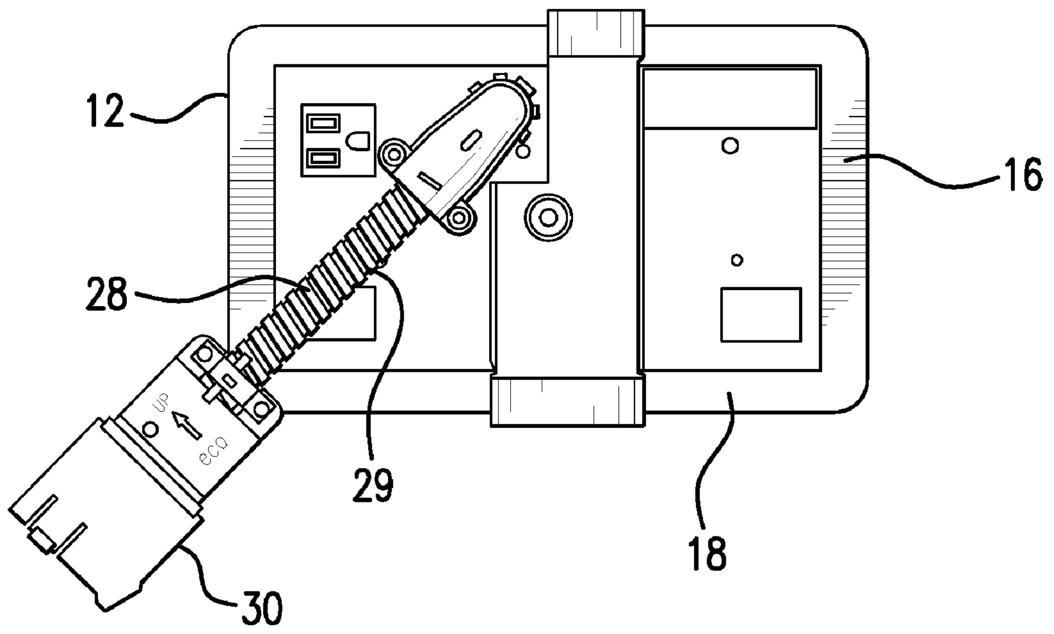
FIG. 2D is a bottom view of the power and communication receptacle device shown in FIG. 2A.
Figure 2E:
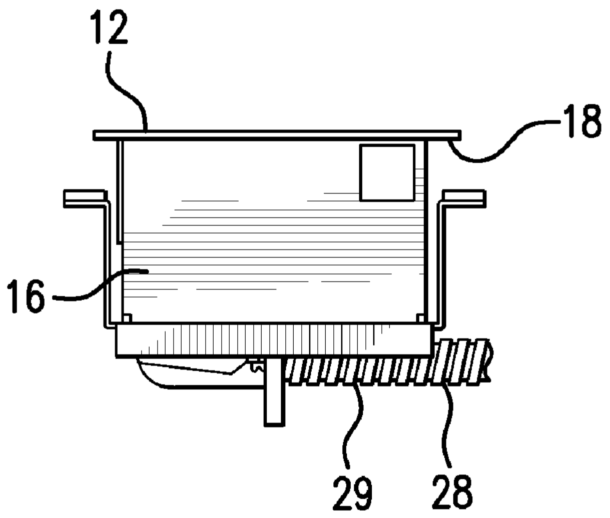
FIG. 2E is a side view of the power and communication receptacle device shown in FIG. 2A.
Figure 3:
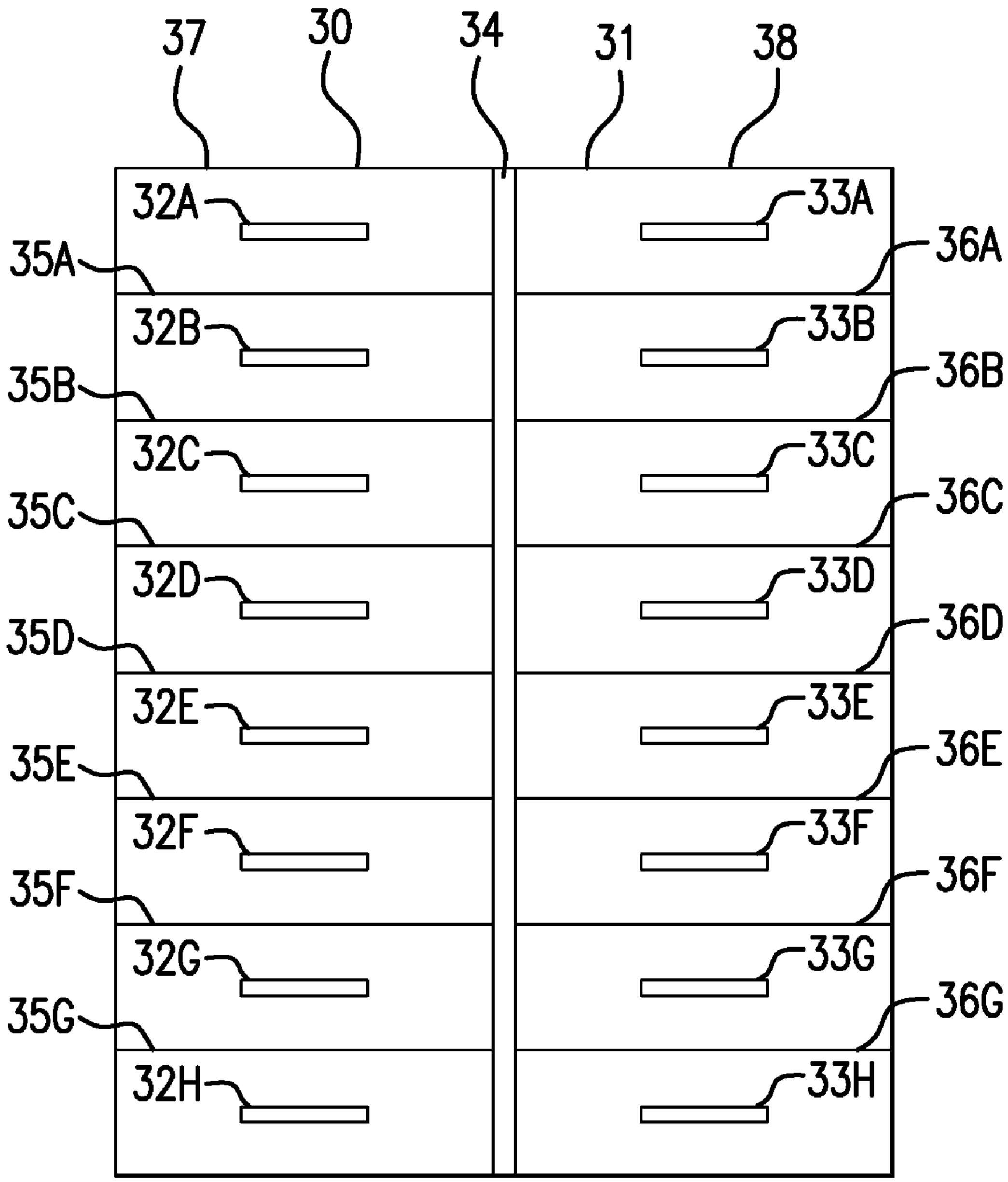
FIG. 3 is a diagram showing the arrangement of electrical conductors in a dual power head depicted in FIG. 2A.

Referring to FIGS. 1A and 2A-2E, each power and communication receptacle devices 12A-D further comprises power cable assemblies 28A-D, respectively. Power cable assemblies 28A, 28B, 28C and 28D are identical in construction. Each power cable assembly 28A-D comprises cable 29A-D, respectively. Each power cable assembly 28A-D also includes power head 30A-D, respectively. Each power cable assembly 28A-D is electrically connected to the power receptacles 24 of the respective power and communication receptacle device 12A-D, respectively. In a preferred embodiment, each power head 30A-D is configured as a dual power head. The arrangement of electrical conductors of each power head 30A-D is shown in FIG. 3. Since each power head 30A-D is identical in construction, only power head 30A is discussed in the ensuing description. Power head 30A comprises housing 31 and a first group of electrical conductors 32A-H and a second group of electrical conductors 33A-H. Electrical conductors 32A-H are on one side of electrical isolation barrier 34 and electrical conductors 33A-H are on the opposite side of electrical isolation barrier 34. Electrical conductors 32A-H are separated from each other by electrical isolation barriers 35A-G. Similarly, electrical conductors 33A-H are separated from each other by electrical isolation barriers 36A-G. Each electrical conductor of the first group of electrical conductors 32A-H is electrically conducted to a corresponding electrical conductor of the second group of electrical conductors 33A-H, respectively. For example, electrical conductor 32A is electrically connected to electrical conductor 33A, and electrical conductor 32B is electrically connected to electrical conductor 33B. Similarly, electrical conductor 32C is electrically connected to electrical conductor 33C, etc. Electrical conductors 32A-H and isolation barrier 34 define a first power head section 37, and electrical conductors 33A-H and isolation barrier 34 define a second power head section 38.

Referring to FIGS. 1A, 2A-2E and 4, apparatus 10 further comprises a plurality of interconnecting power cables 40. For purposes of describing the present invention, power cables 40 are also shown by reference numbers 40A, 40B and 40C. Power feeders 43 and 44 are connected to the respective ends of power cable 40A. Power feeders 45 and 46 are connected to the respective ends of power cable 40B. Power feeders 47 and 48 are connected to respective ends of power cable 40C. Each power feeder 43, 44, 45, 46, 47 and 48 is configured to be plugged into a respective power head section of a corresponding dual power head 30. Such power cables 40 and power feeders are disclosed in the commonly owned U.S. Pat. No. 5,755,583, the disclosure of which patent is hereby incorporated by reference. Power cable 40D has a power feeder 49 and another power feeder (not shown) that is connected to the dual power head (not shown) of a further power and communication receptacle device (not shown).

Figure 4:
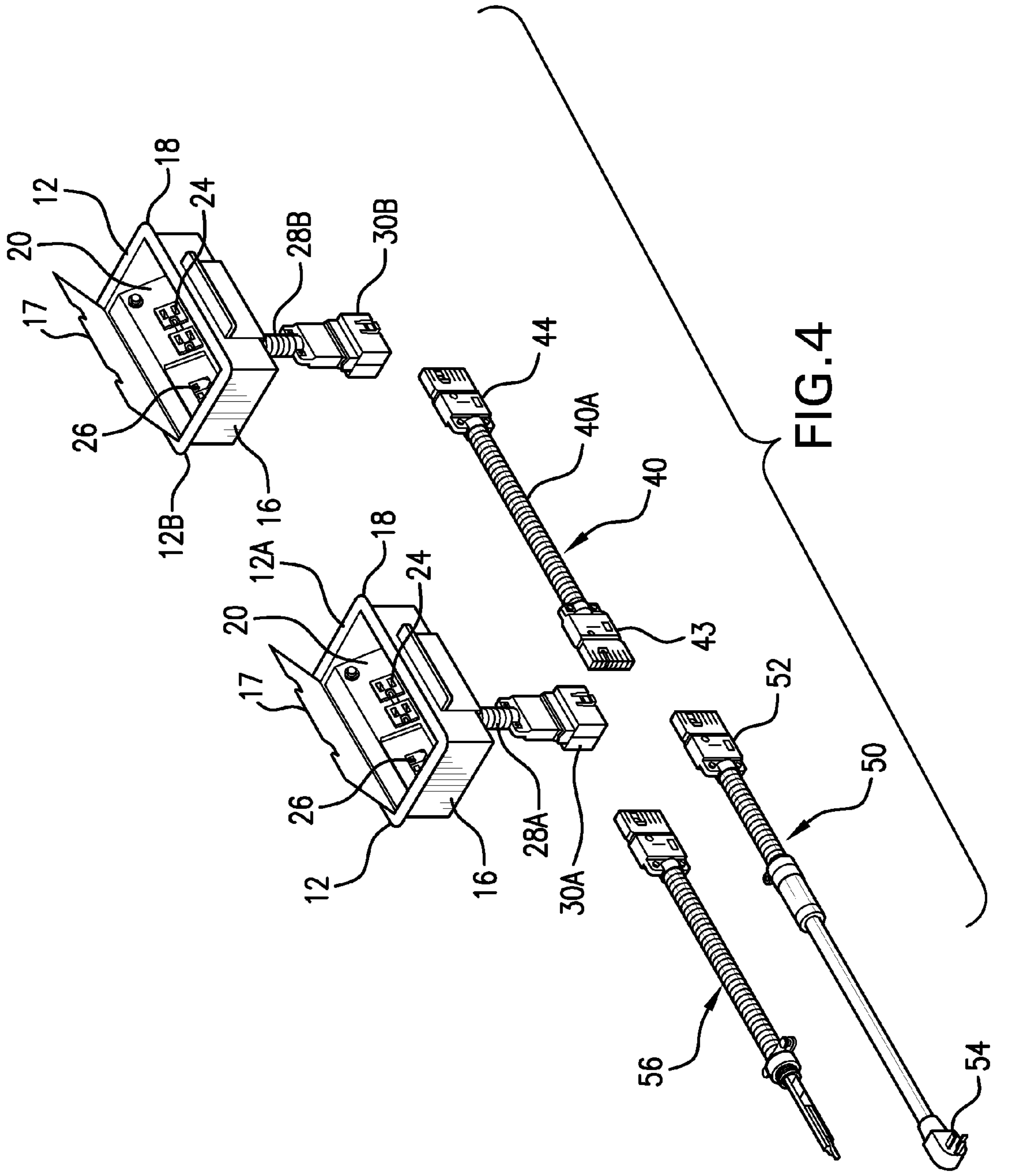
FIG. 4 is a perspective view showing how the power and communication receptacle devices are connected together with interconnecting power cables.

Referring to FIGS. 1A and 4, power feeder 43 of power cable 40A is connected to section 38 of dual power head 30A. Power feeder 44 of power cable 40A is connected to section 37 of power head 30B. Power feeder 45 of power cable 40B is connected to section 38 of power head 30B. Power feeder 46 of power cable 40B is connected to section 37 of power head 30C. Power feeder 47 of power cable 40C is connected to section 38 of power head 30C. Power feeder 48 of power cable 40C is connected to section 37 of power head 30D. Power feeder 49 of power cable 40D is connected to section 38 of power head 30D. The other power feeder (not shown) of power cable 40D is connected to a power head that is not shown.

Referring to FIGS. 1A and 4, apparatus 10 further comprises power feeding cable 50 that comprises power feeder 52 and a plug device 54. Power feeder 52 is connected to section 37 of power head 30A. Plug device 54 is connected to a power source such as an A.C. voltage power source (e.g. 115 VAC). Thus, when plug device 54 is connected to a power source, electrical power is applied to the electrical conductors 32A-H of power head 30A. Since electrical conductors 32A-H are electrically connected to electrical conductors 33A-H, respectively, power cable 40A conducts electrical power as well. Thus electrical power is applied to each power head 30A-D. As a result, electrical power is applied to power receptacles 24 of each power and communication receptacle device 12A-D. It is to be understood that more power and communication receptacle devices 12 can be added to the network shown in FIG. 1A. As described in the foregoing description, power cable 40D can be connected to another power head (not shown) of a further power and communication receptacle device 12 (not shown) In an alternate embodiment, corded power feeding cable 56 is used instead of power feeder cable 50 (see FIG. 4).

Figure 5A:
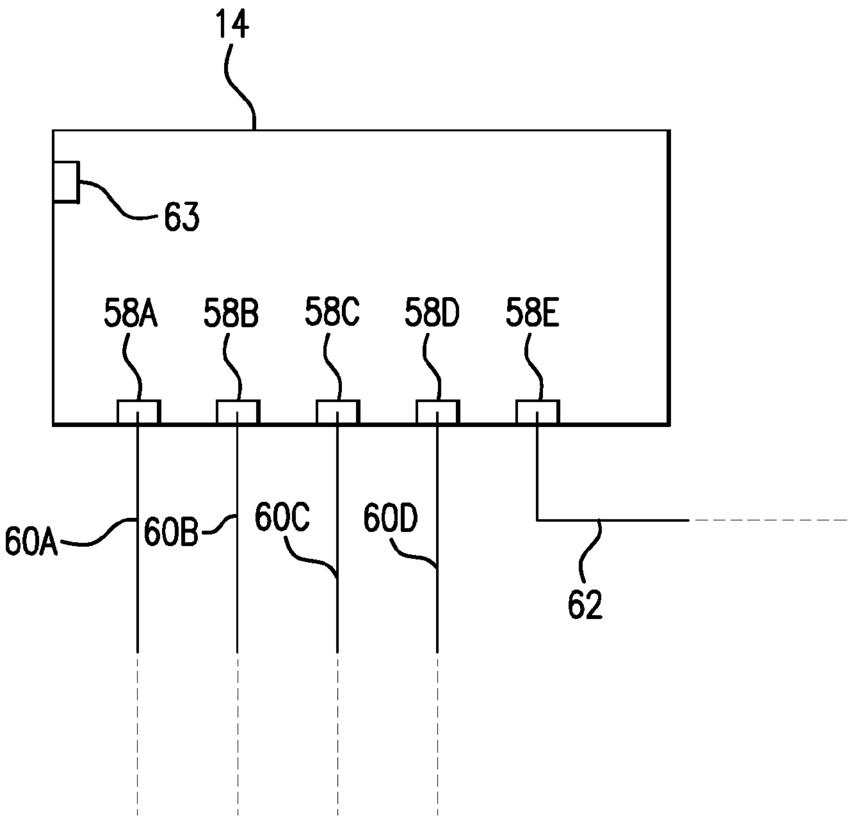
FIG. 5A is a diagram showing the wiring connections to the switch device depicted in FIG. 1.
Figure 5B:
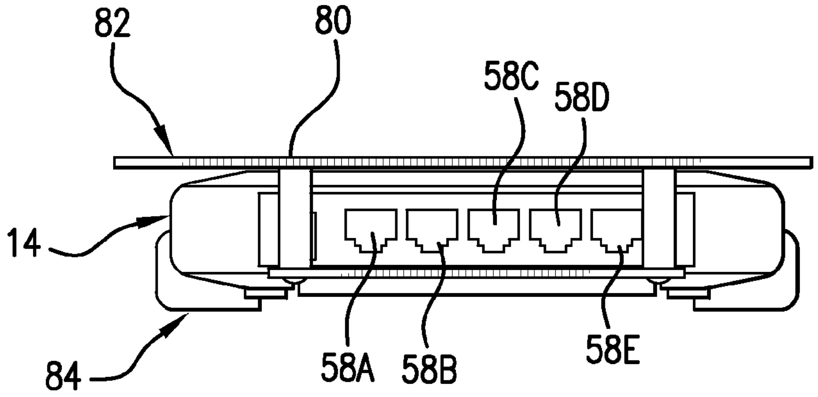
FIG. 5B is a front view of the switch device in accordance with one embodiment of the present invention.

Referring to FIGS. 1A, 5A and 5B, switch device 14 is attached the unit or article of furniture. In a preferred embodiment, switch device 14 is removably attached to the article of furniture. Preferably, switch device 14 is attached to the underside of the work surface of the article of furniture. Any suitable device may be used to removably attach switch network 14 to the unit or article of furniture. Switch device 14 is configured to handle electrical communication signals including digital data signals that are used with computers, telephone network, the internet, wireless modem, etc. In one embodiment, switch device 14 is configured as a commercially available switch. One suitable commercially available switch is the Netgear® 5 Port 10/100 Mbps Ethernet Switch FS605 switch. The function of switch device 14 is discussed in detail in the ensuing description. Referring to FIGS. 1A, 5A and 5B, switch device 14 comprises a plurality of ports 58A-E. Each wire or cable 60A-D is connected to a corresponding communication receptacle 26 and to a corresponding one of ports 58A-D, respectively. For example, wire or cable 60A is connected to the communication receptacle 26 of power and communication receptacle device 12A and to port 58A of switch device 14. The fifth port, port 58E, of switch device 14 is used to connect ports 58A-D to a telephone network, a computer network, the internet, a wireless modem, or another switch device that is generally the same as switch device 14. Thus, wire 62 is connected to port 58E and to any of the aforementioned devices. Switch device 14 also includes power input port 63 to receive an input voltage to facilitate the functioning of switch device 14.

Referring to FIG. 5B, switch device 14 is attached or secured to mounting assembly 80 that comprises mounting bracket 82 and clamping bracket 84. Clamping bracket 84 is removably attached to mounting bracket 82. Clamping bracket 84 retains switch device 14 between clamping bracket 84 and mounting bracket 82. Mounting bracket 82 is attached to a unit of furniture. In a preferred embodiment, mounting bracket 82 is removable attached to the unit of furniture, preferably below the work surface.

Referring to FIGS. 1A and 4, power and communication receptacle devices 12A-D are identically constructed, power cable assemblies 28A-D are identically constructed, and power cables 40A-D are identically constructed. Thus, the configuration, symmetry and design of the components of apparatus 10 allow for the network shown in FIG. 1A to be easily expanded.

Although switch device 14 has been described as having RJ45 ports therein, it is to be understood that switch device 14 can be modified to have different types of ports, such as USB ports.

In one of many applications of the present invention, the network can be implemented with a plurality of conference tables. In such an application, each conference table has four power and communication receptacle devices 12 and a single switch device 14. The switch device 14 on each conference table is in electronic signal communication with each of the power and communication receptacle devices 12 that are mounted to the conference table. Each switch device 14 of each conference table is in electronic signal communication with another switch device 14 on a next conference table. One of the switch devices 14 of one of the succeeding conference tables is in electrical signal communication with a telephone network, a computer network, the internet, wireless modem, etc. The power receptacles 24 of each power and communication receptacle devices 12 receive electrical power as described in the foregoing description. A power cable 40 is connected between the dual power head 30 of one of the power and communication receptacle devices 12 on one conference table and the dual power head 30 of a power and communication receptacle device 12 on a next conference table. In such a configuration, there is a single switch device 14 for every four (4) power and communication receptacle devices 14. Other network configurations are possible.

Figure 1B:
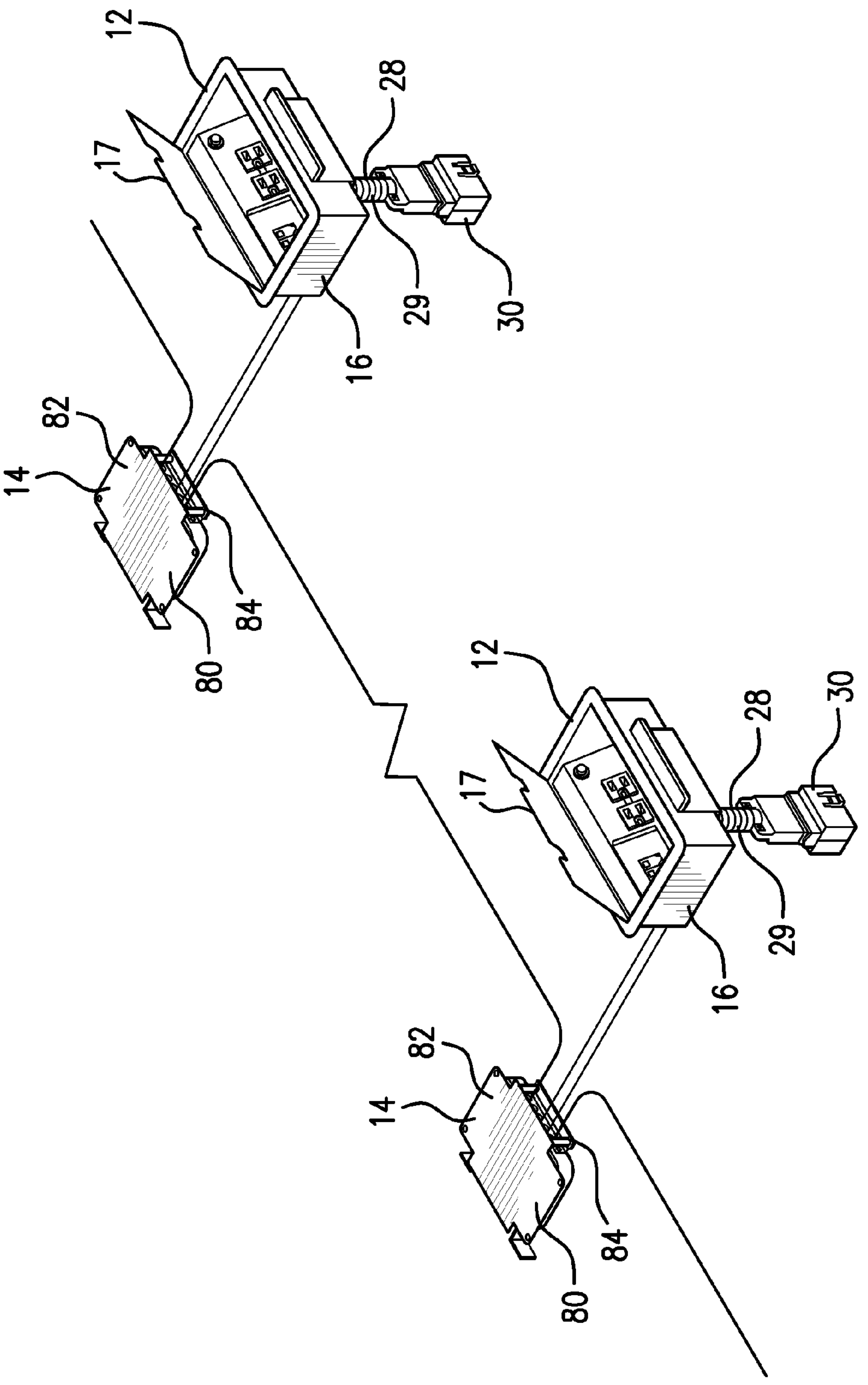
FIG. 1B is a block diagram of the apparatus of the present invention wherein the power and communication receptacle devices and switch devices are arranged in an alternate network configuration.

Referring to FIG. 1B, there is shown an alternate network configuration. In this network, there are a plurality of switch devices 14 and each power and communication receptacle device 12 has two communication receptacles 26 (as shown in FIG. 2A). Each communication receptacle 26 is connected to a corresponding port of a switch device 14. One port of each switch device 14 is connected to the port of a next switch device 14. One port of one of the switch devices 14 in the chain of switch devices (some of which are not shown) is in electronic signal communication with a computer network, telephone network, internet, wireless modem, etc.

In an alternate embodiment, a network may be configured without switch devices 14. In such an embodiment, the network would use only power and communication receptacle devices 12 without any switch devices 14.

Figure 6A:
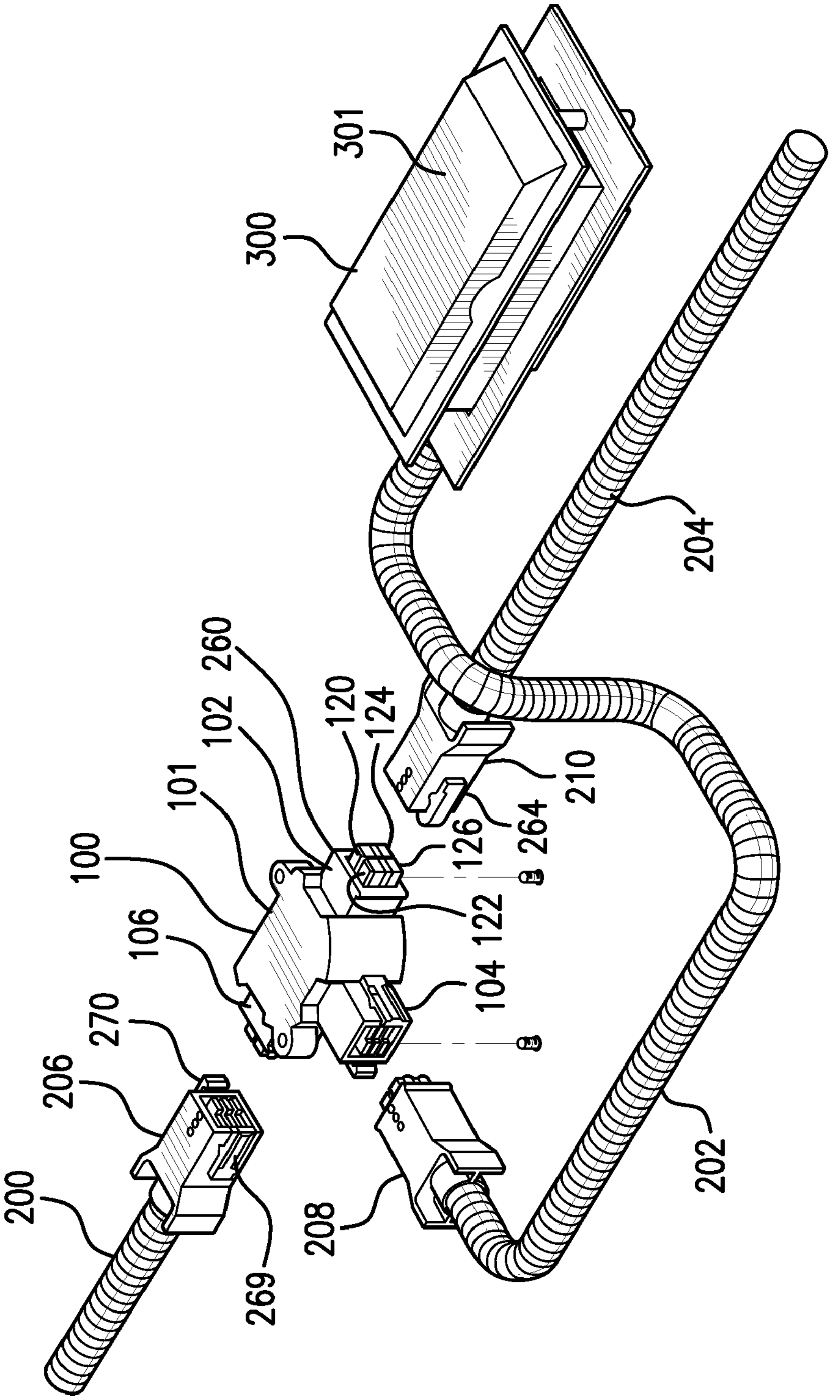
FIG. 6A is a perspective view showing a junction power connector used to form a network of power and communication receptacle devices in accordance with another embodiment of the present invention.
Figure 6B:
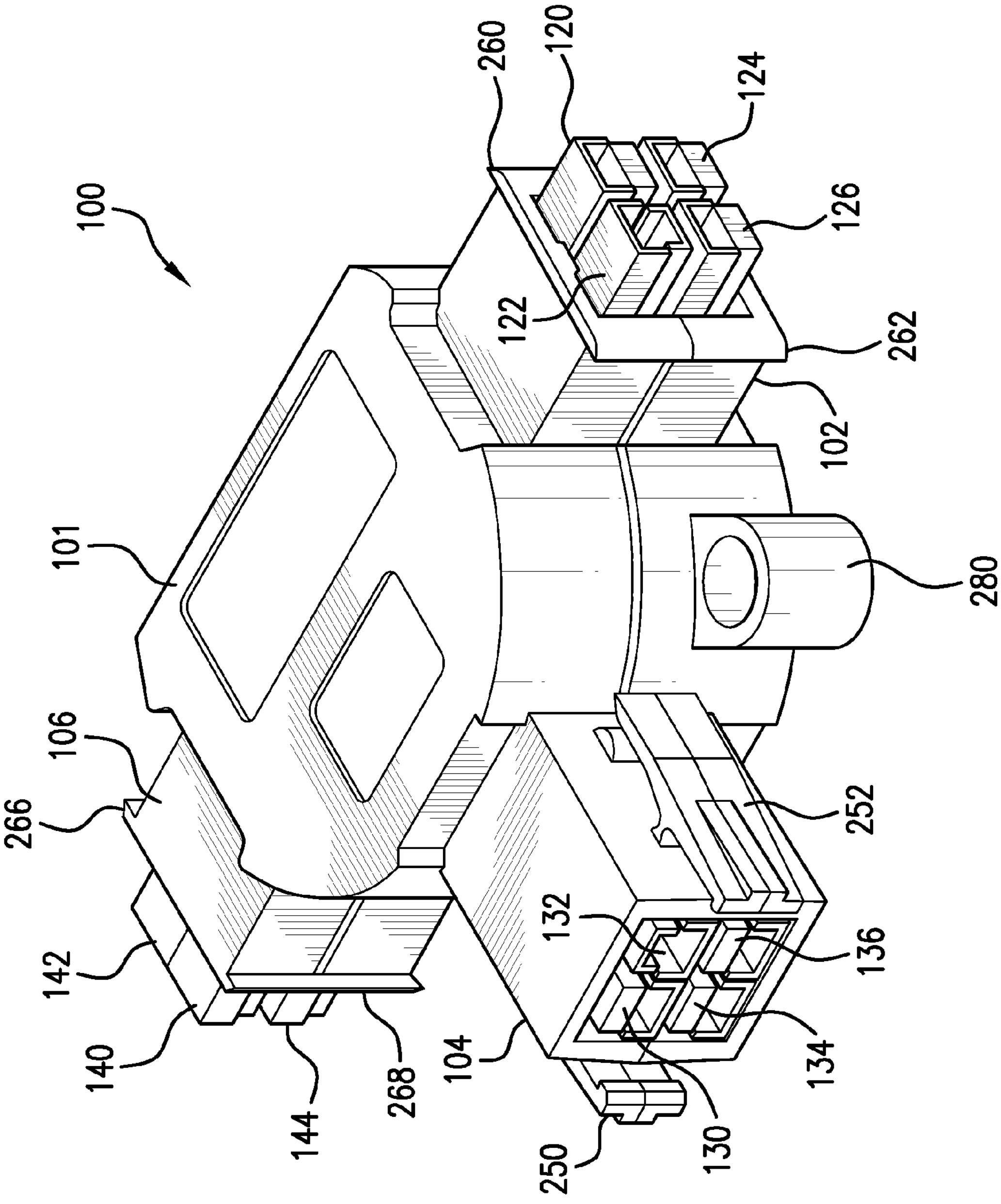
FIG. 6B is a perspective view of the junction power connector depicted in FIG. 6A.
Figure 7A:
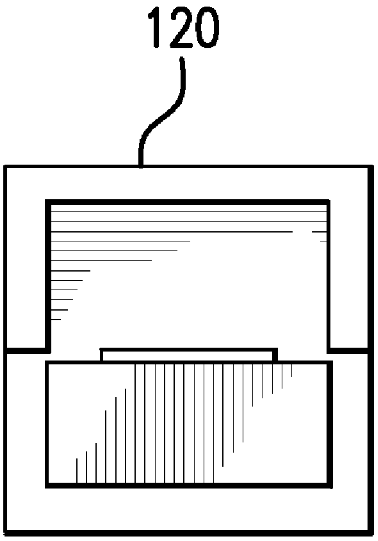
FIG. 7A is an end view of one of the conductors of the junction power connector of FIG. 6A.
Figure 7B:
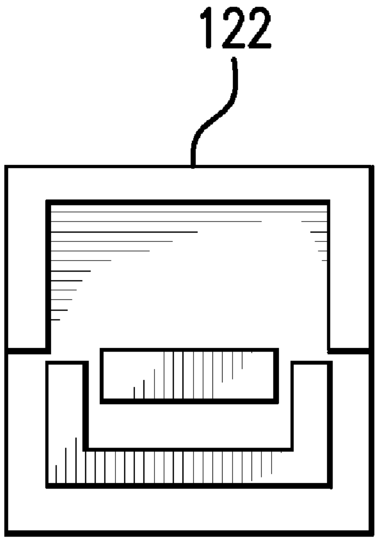
FIG. 7B is an end view of another one of the conductors of the junction power connector of FIG. 6A

Referring to FIGS. 6A, 6B, 7A and 7B, there is shown an alternate embodiment of the present invention. Junction power connector 100 is used to create any one of numerous possible network configurations. In a preferred embodiment, junction power connector 100 has a generally "T" shape and comprises casing or housing 101 and three connector sections 102, 104 and 106. In a preferred embodiment, connector sections 102, 104 and 106 are about 900 apart. Each connector section 102, 104 and 106 has a set of four electrical conductors. Specifically, connector section 102 has electrical conductors 120, 122, 124 and 126. In a preferred embodiment, each electrical conductor 120, 122, 124 and 126 is configured as a Power Pole® conductor manufactured by Anderson Power Products, Inc. of Sterling, Mass. Electrical conductor 120 is the "white" or neutral conductor, electrical conductor 122 is the "green" or ground conductor, electrical conductor 124 is the "black" or "hot" conductor, and electrical conductor 126 is the "red" or "hot" conductor. FIGS. 7A and 7B show end views of conductors 120 and 122, respectively. Conductors 124 and 126 have the same structure as conductor 120. Connector section 104 has electrical conductors 130, 132, 134 and 136. Electrical conductor 130 is the "white" or neutral conductor, electrical conductor 132 is the "green" or ground conductor, electrical conductor 134 is the "black" or "hot" conductor, and electrical conductor 136 is the "red" or "hot" conductor. Connector section 106 has electrical conductors 140, 142, 144 and a fourth conductor which is not shown. Electrical conductor 140 is the "white" or neutral conductor, electrical conductor 142 is the "green" or ground conductor, electrical conductor 144 is the "black" or "hot" conductor, and the fourth electrical conductor (not shown) is the "red" or "hot" conductor. All neutral conductors 120, 130 and 140 are electrically connected together. All ground conductors 122, 132 and 142 are electrically connected together. All "black" or "hot" conductors 124, 134 and 144 are electrically connected together. Similarly, all "red" or "hot" conductors 126, 136 and the "red" conductor (not shown) of connector section 106 are connected together. Power cables 200, 202 and 204 have connectors 206, 208 and 210, respectively. Each connector 206, 208 and 210 has a group of complementary mating conductors that are configured to mate with the conductors of each connector section 106, 104 and 102, respectively. Power cable 202 is connected to power and communication receptacle device 300. Device 300 has substantially the same purpose, function, structure and configuration as power and communication receptacle device 12. Device 300 is shown with its lid 301 in the closed position.

Although each connector section 102, 104 and 106 is described as having a set of four conductors, it is to be understood that power connector 100 can be configured so that each set of conductors of each connector section 102, 104 and 106 has more or less than four conductors.

Referring again to FIGS. 6A and 6B, casing 101 of power connector 100 has resilient clamping members 250 and 252 that allow connectors, such as connector 208, to be removably connected to connector section 104. Connector section 102 has flanges 260 and 262, respectively. Flanges 260 and 262 engage resilient clamping members 264 on connector 210.

Similarly, connector section 106 has flanges 266 and 268. Flanges 266 and 268 engage resilient clamping members 269 and 270 on connector 206. Referring to FIG. 6B, casing 101 further comprises at least one eye loop 280 that allows power connector 100 to be attached to a work surface or unit of furniture.

In a preferred embodiment, casing 101 is fabricated from plastic.

Junction power connector 100 allows users to create any one of numerous possible network configurations with power and communication receptacle devices 300.

In an alternate embodiment, casing 101 is configured to have additional resilient clamping members (similar to resilient clamping members 250 and 252) on connector sections 102 and 106.

An important advantage of the present invention is that the power and communication receptacle devices do not have to be installed and/or arranged in a particular sequence in order for the network to operate correctly. Thus, unlike many prior art networks, the power and communication receptacle devices of the present invention may be arranged and/or installed in a non-sequential order.

Figure 8:
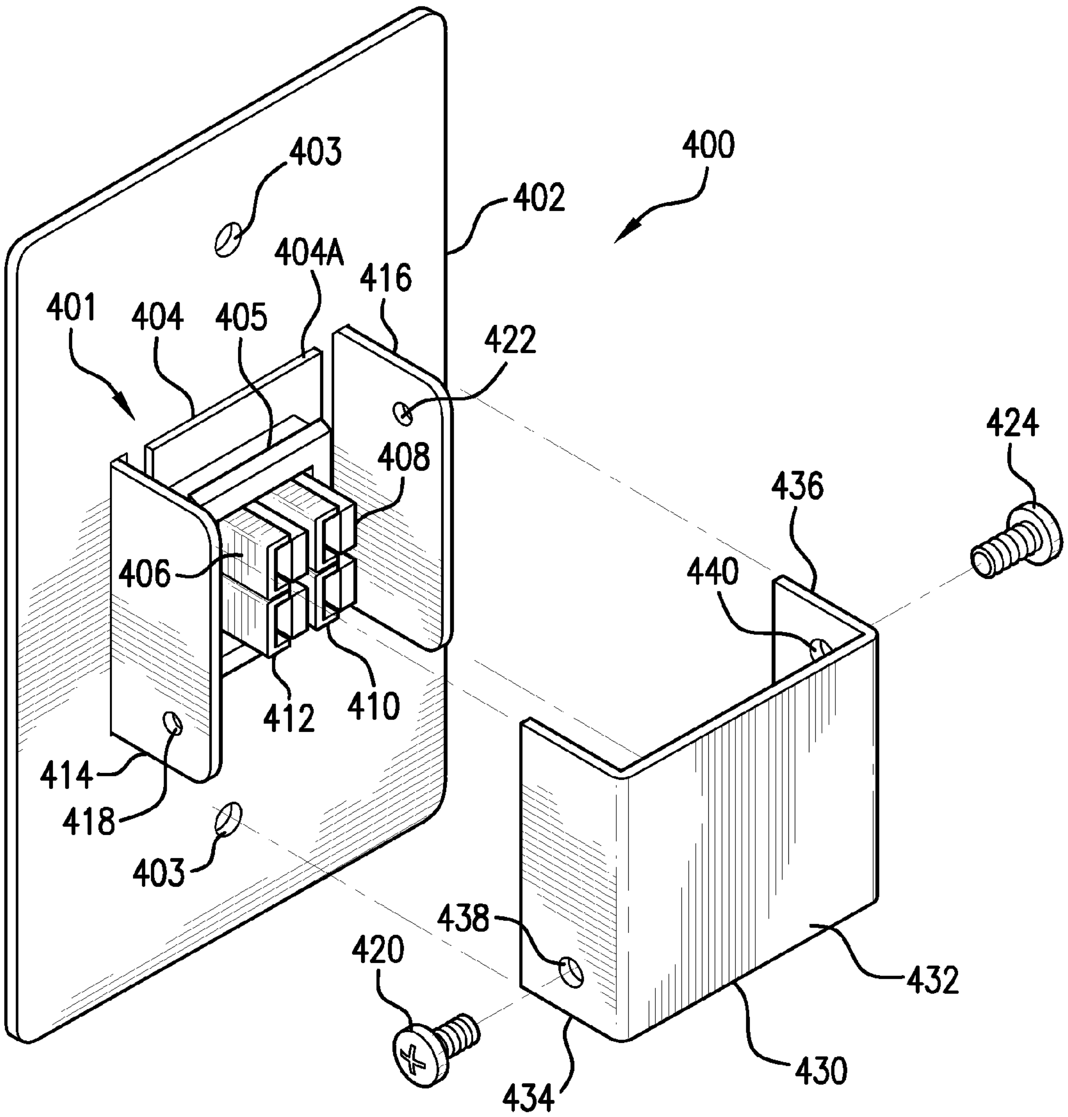
FIG. 8 is a perspective view of a power connector in accordance with a further embodiment of the present invention.
Figure 9:
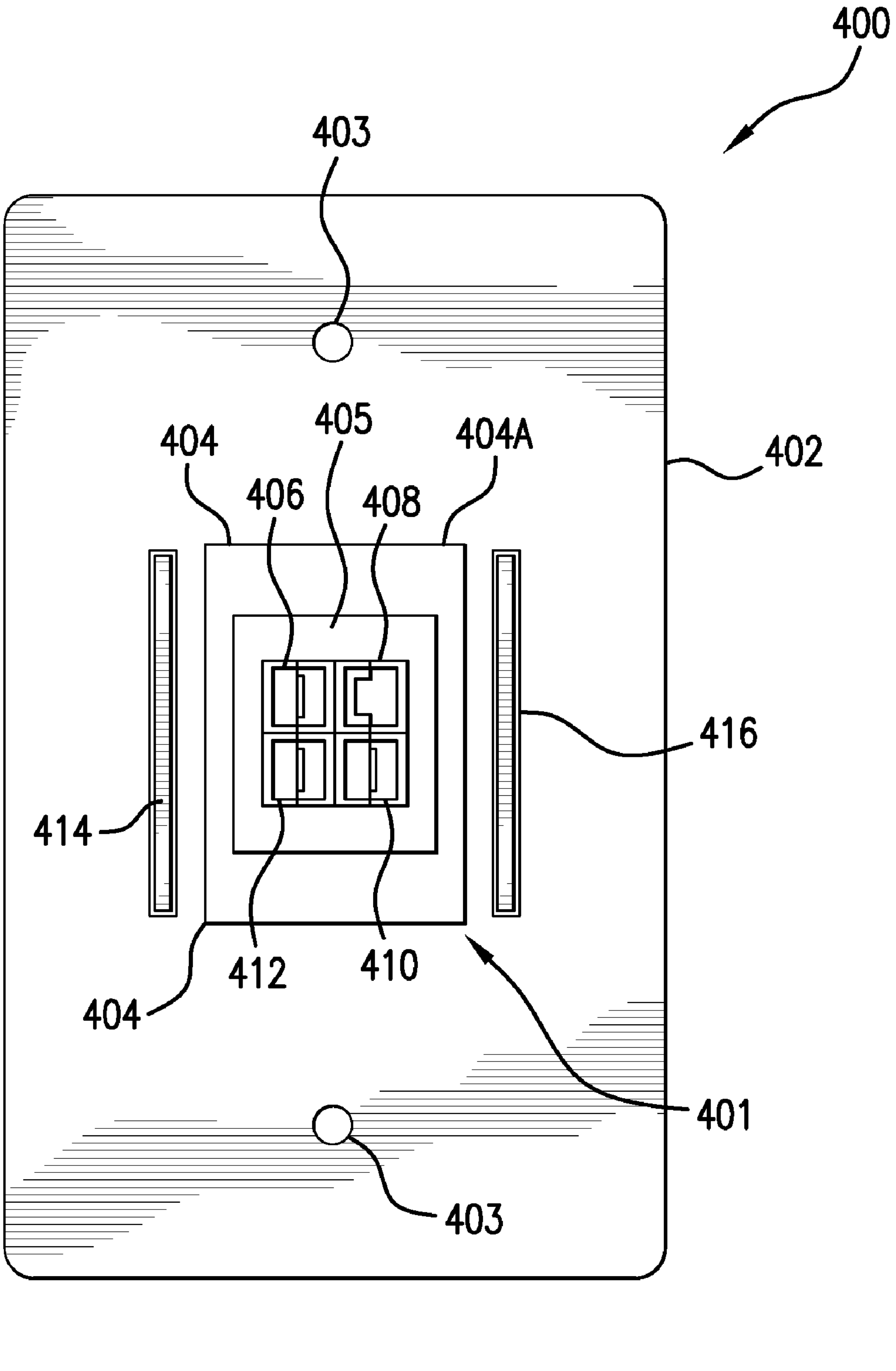
FIG. 9 is a front view of the power connector of FIG. 8.
Figure 10:
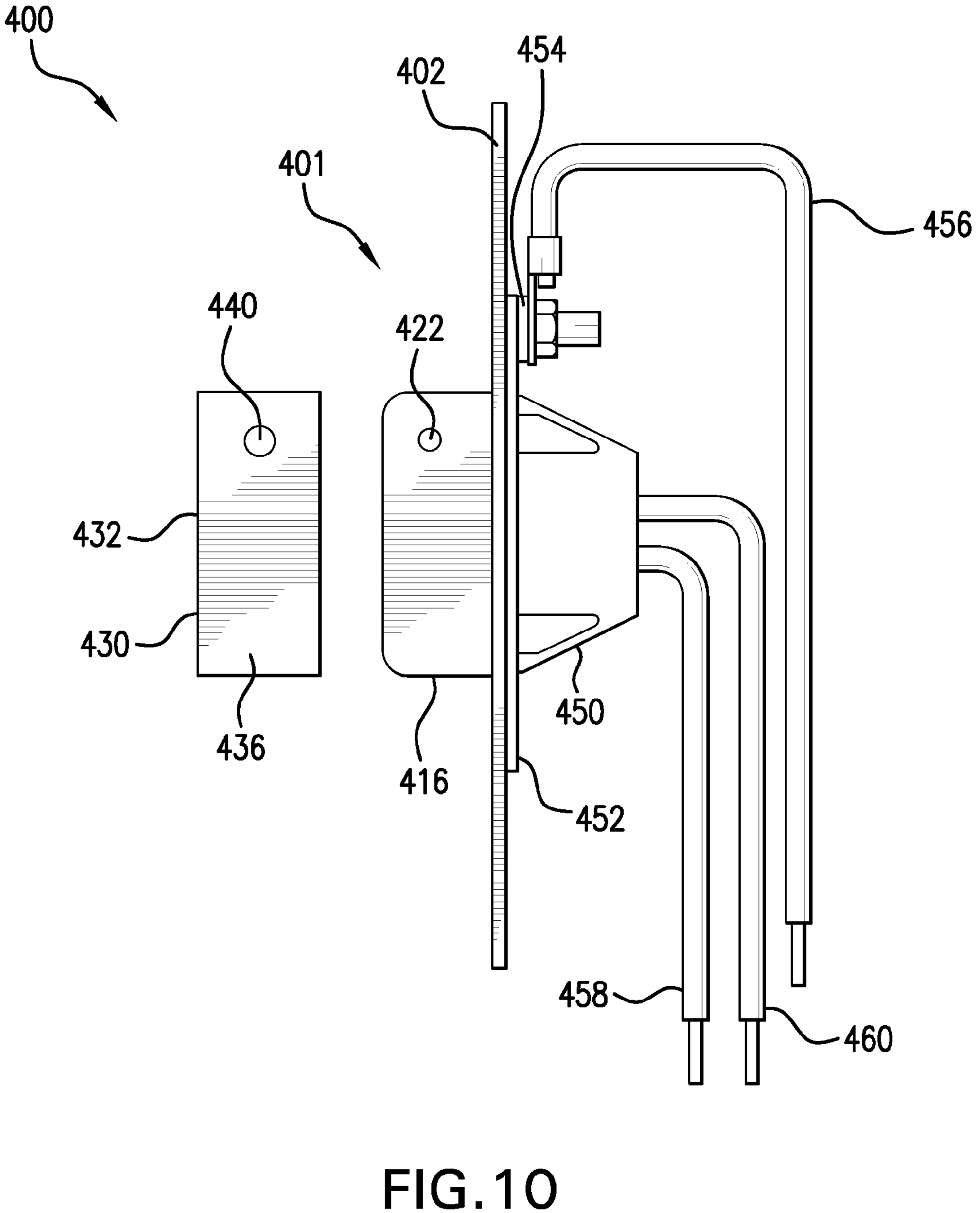
FIG. 10 is a right side view of the power connector of the FIG. 8, the view of the left side being essentially the same.

Referring to FIGS. 8 and 9, there is shown an alternate power connector 400 that can be mounted to a wall or other structure and which can be used to create any one numerous possible network configurations. Power connector 400 generally comprises connector section 401 and plate member 402. Connector section 401 is attached to plate member 402. Connector section 401 comprises base 404 which is rigidly connected to plate member 402. Base 404 comprises an outer peripheral portion 404A and a raised, central section 405 that protrudes outward with respect to portion 404A. Plate member 402 includes openings 403 that are sized to receive a fastening device, such as a nail, screw or similar device, so that power connector 400 can be attached to a wall, item of furniture or some other structure. Power connector 400 further comprises a set of four electrical conductors 406, 408, 410 and 412 that extend from and are attached to central section 405. Each electrical conductor 406, 408, 410 and 412 has substantially the same construction and configuration as conductors 122, 120, 124 and 126, respectively, of junction power connector 100 (see FIGS. 6A and 6B). In a preferred embodiment, each electrical conductor 406, 408, 410 and 412 is configured as a Power Pole® conductor manufactured by Anderson Power Products, Inc. of Sterling, Mass. Electrical conductor 406 is the "white" or neutral conductor, electrical conductor 408 is the "green" or ground conductor, electrical conductor 410 is the "black" or "hot" conductor, and electrical conductor 412 is the "red" or "hot" conductor. Power connector 400 further includes brackets 414 and 416 that are located on either side of base 404. Brackets 414 and 416 are rigidly connected to plate member 402. In a preferred embodiment, brackets 414 and 416 are substantially perpendicular to plate member 402. Bracket 414 includes opening 418 for receiving screw 420. Similarly, bracket 416 includes opening 422 for receiving screw 424. In one embodiment, openings 418 and 422 are threaded. Power connector 400 further includes cover member 430 that can be removably attached to brackets 414 and 416. Cover member 430 comprises front wall 432 and sidewalls 434 and 436. Sidewalls 434 and 436 are substantially orthogonal to front wall 432. Sidewall 434 includes opening 438 that is sized for receiving screw 420. Similarly, sidewall 436 includes opening 440 that is sized for receiving screw 424. In a preferred embodiment, openings 438 and 440 are threaded. Cover member 430 is sized so that sidewalls 434 and 436 fit over the exterior surfaces of sidewalls 414 and 416, respectively. Screw 420 is inserted through openings 438 of sidewall 434 and opening 418 of bracket 414. Similarly, screw 424 is inserted through opening 440 of sidewall 436 and through opening 422 of bracket 416. Connectors 206, 208 and 210 (see FIGS. 6A and 6B) of power cables 200, 202 and 204, respectively, have complementary mating conductors that are configured to mate with conductors 406, 408, 410 and 412. Referring to FIG. 10, power connector 400 further comprises rear section 450 and ground plate member 452. Ground plate member 452 is attached to rear section 450 and the rear side of plate member 402. Ground plate member 452 includes terminal 454 to which ground wire 456 is connected. The rear portions (not shown) of conductors 406, 408, 410 and 412 are accessible at rear section 450. For purposes of example, FIG. 10 shows wires 458 and 460 connected to the rear portions of two of the connectors 406, 408, 410 and 412. Referring back to FIG. 8, cover member 430 may be removably attached to brackets 414 and 416 when power connector 400 is not being used. Cover member 430 may be removed by removing screws 420 and 424. Optionally, only screw 424 is used so that cover member 430 can be pivoted upward to expose conductors 406, 408, 410 and 412, or pivoted downward to cover conductors 406, 408, 410 and 412. In such a configuration, cover member 430 is pivotally attached to brackets 414 and 416.

Figure 11:
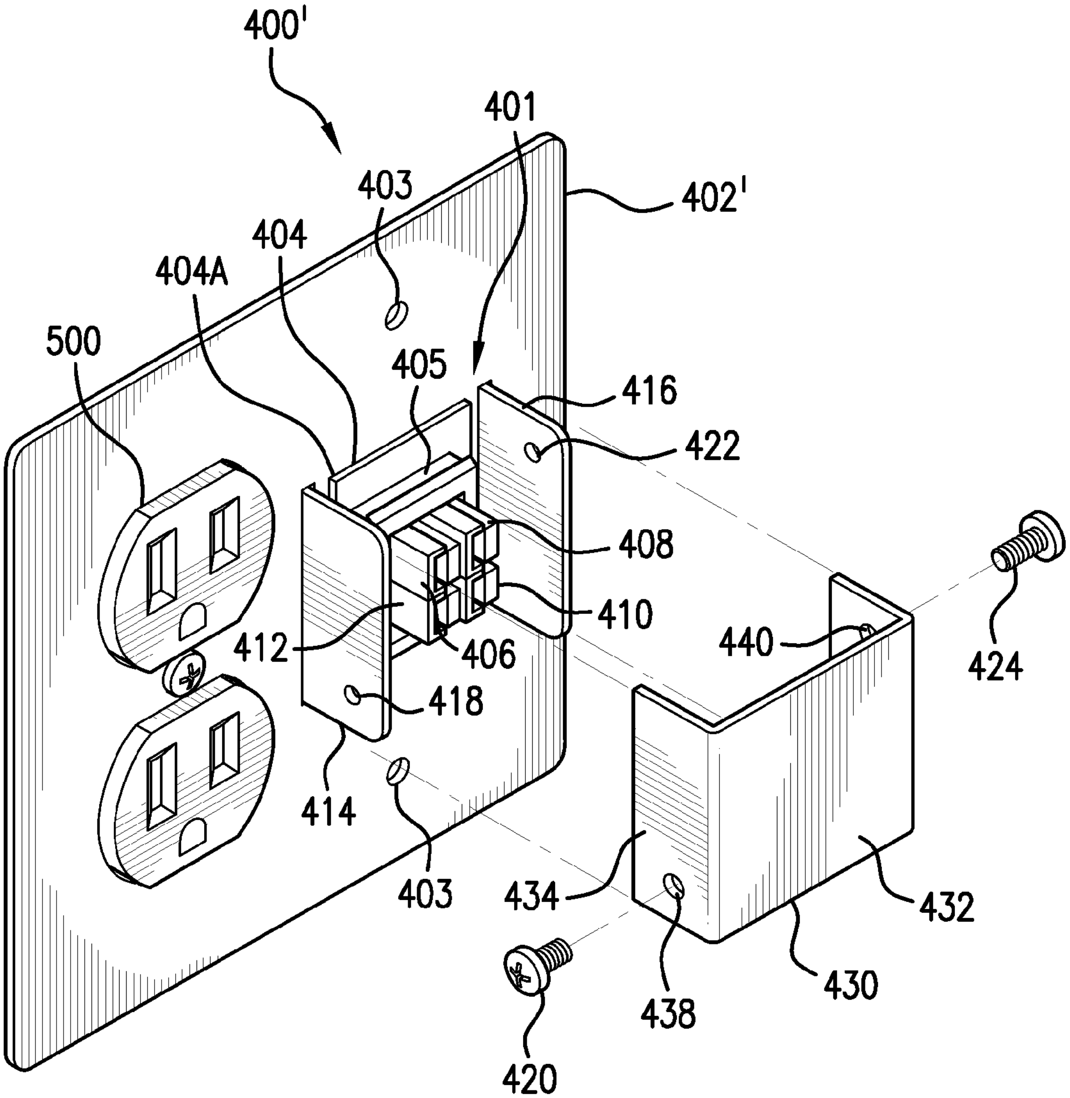
FIG. 11 is a perspective view of a power connector in accordance with another embodiment of the present invention.
Figure 12:
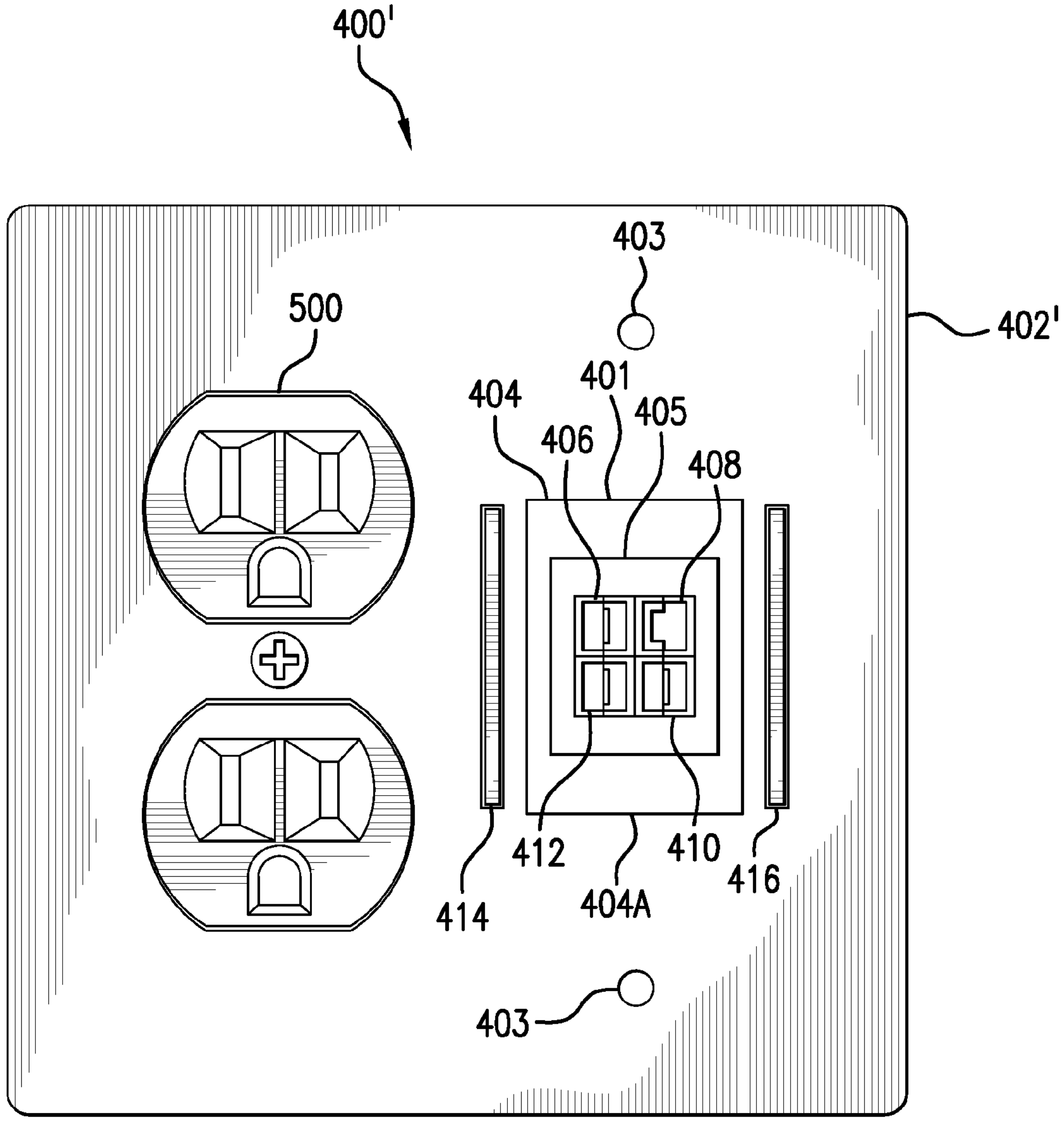
FIG. 12 is a front view of the power connector of FIG. 11.
Figure 13:
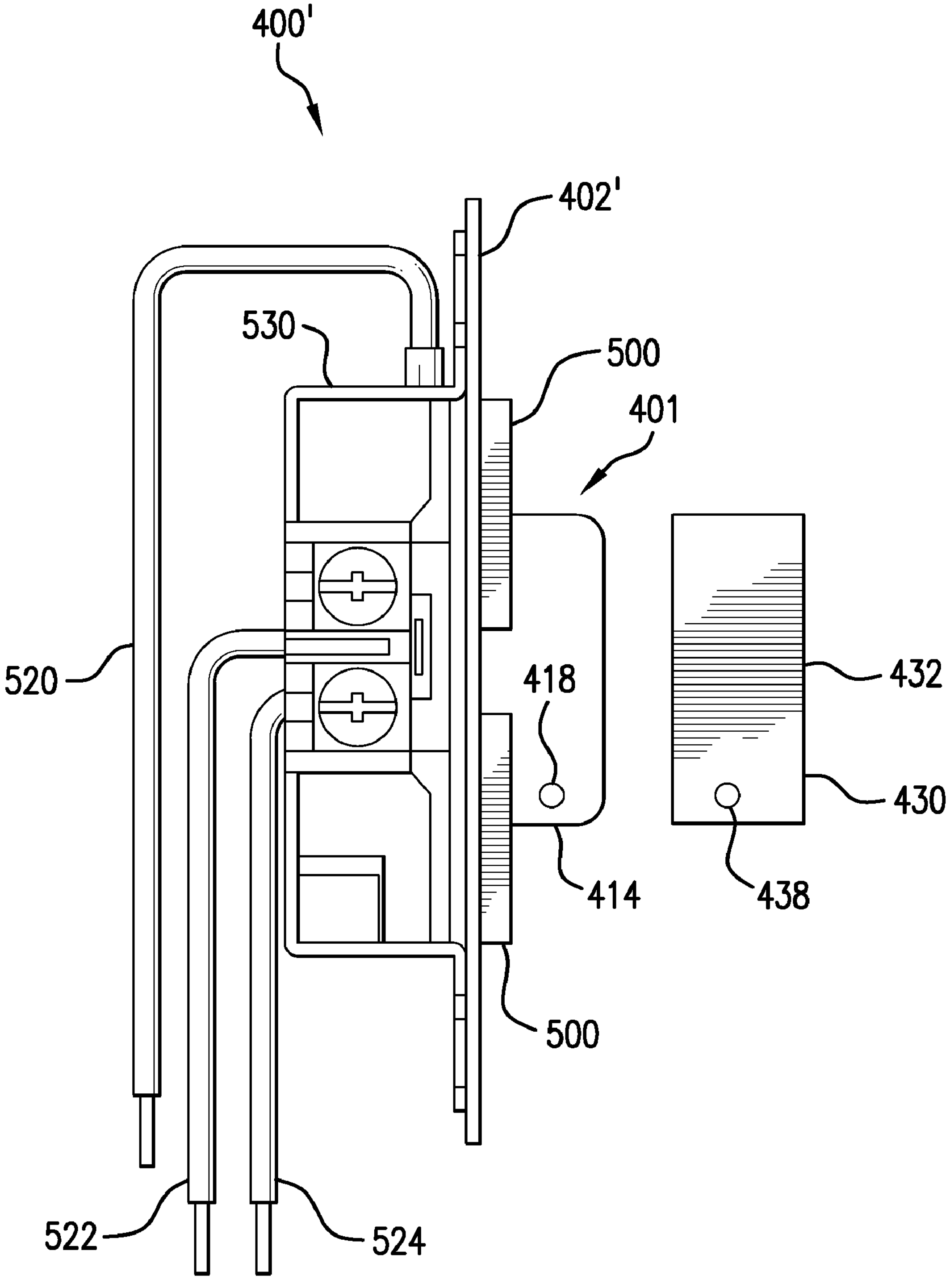
FIG. 13 is a left side view of the power connector of FIG. 11.

Referring to FIGS. 11 and 12, there is shown power connector 400' in accordance with another embodiment of the present invention. Power connector 400' comprises connector section 401 and cover member 430 that were described in the foregoing description and shown in FIGS. 8 and 10. Power connector 400' further includes base plate 402' that is similar to base plate 402 (see FIGS. 8 and 10) with the exception that it is modified to receive a commercially available power receptacle 500. Power receptacle 500 is well known in the art and therefore, is not discussed in detail. Referring to FIG. 13, wires are connected to terminals located on the rear portions of conductors 406, 408, 410 and 412, and receptacle 500. For purposes of example, wires 522 and 524 are connected to terminals on receptacle 500, and wire ground 520 is connected to the electrically conductive base 530 of receptacle 500.

While the foregoing description is exemplary of the present invention, those of ordinary skill in the relevant arts will recognize the many variations, alterations, modifications, substitutions and the like are readily possible, especially in light of this description, the accompanying drawings and the claims drawn hereto. In any case, because the scope of the invention is much broader than any particular embodiment, the foregoing detailed description should not be construed as a limitation of the present invention, which is limited only by the claims appended hereto.

What is claimed is:

1. A network of power and communication receptacle devices comprising:

a plurality of power and communication receptacle devices, each power and communication receptacle device comprising at least one power receptacle, at least one communication receptacle, and a power cable assembly having a dual power head, the power cable assembly being configured to provide electrical power to the power receptacle;

a plurality of interconnecting power cables, each power cable having a first power feeder electrically connected to the dual power head of one of the power and communication receptacle devices and a second power feeder electrically connected to the dual power head of a next power and communication receptacle device;

a power feeding cable having electrically connected thereto a power feeder for connection to a dual power head of a first one of the power and communication receptacles and a device for connection to a power source; and a communication signal switching device having a plurality of ports, the communication receptacle of each power and communication receptacle device being in electronic signal communication with a corresponding port of the communication signal switching device.

2. A network of power and communication receptacle devices comprising:

a plurality of power and communication receptacle devices, each power and communication receptacle device comprising at least one power receptacle, at least one communication receptacle, and a power cable assembly having a dual power head, the power cable assembly being configured to provide electrical power to the power receptacle;

at least one junction power connector device having three sections, each section having a group of conductors;

a plurality of interconnecting power cables wherein each power cable is electrically connected to a corresponding power and communication receptacle device, each power cable including a connector comprising a group of complementary mating conductors, each of the complementary mating conductors being electrically connected to a corresponding conductor of the group of conductors of the at least one junction power connector device; and a communication signal switching device having a plurality of ports, each communication receptacle of each power and communication receptacle device being in electronic signal communication with a corresponding port of the communication signal switching device.

3. The network according to claim 2 wherein the junction power connector device is generally “T” shaped.

4. The network according to claim 3 wherein each group of conductors of the junction power connector device are about 90° apart.

5. A junction power connector device, comprising a casing having three connector sections, each connector section comprising a group of electrical conductors, each electrical conductor in each connector section being electrically connected to a corresponding electrical conductor in each of the other connector sections, each group of electrical conductors consisting of four electrical conductors arranged in two columns wherein each column has two electrical conductors.

6. The junction power connector device according to claim 5 wherein the junction power connector device is generally “T” shaped.

7. The junction power connector device according to claim 5 wherein the connector sections are about 90° apart.

8. The junction power connector device according to claim 5 wherein the casing includes at least one eye-loop for receiving a fastening device to allow the junction power connector to be attached to a structure or article of furniture.

9. The junction power connector device according to claim 5 wherein the casing includes at least one resilient clamping member adjacent to a corresponding connector section to allow a cable connector to be removably attached to said corresponding connector section.

10. The junction power connector device according to claim 5 wherein the casing includes a pair of flanges located on a corresponding connector section wherein the electrical conductors of that corresponding connector section are between the flanges, the flanges being configured so as to allow a cable connector to be removably attached to said corresponding connector section.

* * * * *